United States Patent [19]

Epple et al.

[11] Patent Number: 5,376,725

[45] Date of Patent: Dec. 27, 1994

[54] ALLOYS OF CYCLOOLEFIN POLYMERS AND POLYARYL ETHER KETONES

[75] Inventors: Ulrich Epple, Eschborn; Arnold Schneller, Mainz; Harald Cherdron, Wiesbaden, all of Germany

[73] Assignee: Hoechst Aktiengesellschaft, Frankfurt am Main, Germany

[21] Appl. No.: 117,016

[22] PCT Filed: Mar. 21, 1992

[86] PCT No.: PCT/EP92/00629

§ 371 Date: Sep. 8, 1993

§ 102(e) Date: Sep. 8, 1993

[87] PCT Pub. No.: WO92/17544

PCT Pub. Date: Oct. 15, 1992

[30] Foreign Application Priority Data

Apr. 6, 1991 [DE] Germany ............... 4111197

[51] Int. Cl.$^5$ ............... C08L 23/18; C08L 23/20; C08L 23/24; C08L 61/16

[52] U.S. Cl. .................. 525/153; 526/221; 526/223

[58] Field of Search ............... 525/153; 526/281, 283

[56] References Cited

U.S. PATENT DOCUMENTS

| | | | |
|---|---|---|---|
| 4,720,537 | 1/1987 | Brugel | 529/125 |
| 4,948,856 | 8/1990 | Minchak et al. | 526/281 |
| 5,089,562 | 2/1992 | van de Meer et al. | 525/132 |

FOREIGN PATENT DOCUMENTS

| | | |
|---|---|---|
| 0229470 | 7/1987 | European Pat. Off. |
| 0363578 | 4/1990 | European Pat. Off. |

*Primary Examiner*—James J. Seidleck
*Assistant Examiner*—W. Robinson M. Clark
*Attorney, Agent, or Firm*—Curtis, Morris & Safford

[57] ABSTRACT

Polymer alloys which comprise (A) at least one cycloolefin polymer and (B) at least one polyaryl ether ketone, the amounts of (A) being 1 to 99% by weight and those of (B) being 99 to 1% by weight and relatively making up 100% by weight, with respect to the total alloy, are described. Such polymer alloys can be used as a matrix material for composite materials or for the production of shaped articles.

11 Claims, No Drawings

ALLOYS OF CYCLOOLEFIN POLYMERS AND POLYARYL ETHER KETONES

The synthesis and properties of cycloolefin polymers have been the subject of many publications recently. It is known that these olefins can be polymerized by means of various catalysts. Depending on the catalyst, the polymerization proceeds via ring opening (U.S. Pat. No. 3,577,072, U.S. Pat. No. 4,178,424) or by opening of the double bond (EP-A-156464, EP-A-283164, EP-A-291208, EP-A-291970, DE-A-3922546).

Cycloolefin homo- and copolymers are a class of polymer with an outstanding level of properties. They are distinguished, inter alia, by a high heat distortion point, stability to hydrolysis, a low absorption of water, resistance to weathering and transparency. Nevertheless, processability at high temperatures and high shearing forces is limited due to oxidative and thermal processes. Additives such as antioxidants and heat stabilizers are employed to extend the thermal processing range. High contents of additives can lead to a severely adverse impairment of the mechanical properties, such as the E modulus and yield stress, occurring. Additives can thus act as plasticizers, the shear modulus also being reduced over a wide temperature range.

To guarantee the processability of a polymer without occurrence of high shearing forces, the flow properties of the polymer can be improved by flow improvers, such as PE waxes. However, a severely adverse impairment of the abovementioned mechanical properties is also recorded here.

Polyaryl ether ketones are likewise well-known, which is demonstrated by the large number of publications on synthesis and properties: U.S. Pat. No. 3,953,400; U.S. Pat. No. 3,956,240; U.S. Pat. No. 4,247,682; U.S. Pat. No. 4,320,224; U.S. Pat. No. 4,339,568; Polymer 22 (1981), 1096–1103; Polymer 24 (1983), 953–958.

Polyaryl ether ketones are also a valuable class of polymer which is distinguished, inter alia, by a good impact strength and high heat resistance. Some polyaryl ether ketones are highly crystalline and exhibit melting temperatures far in excess of 300° C., while others are amorphous. Amorphous and partly crystalline polyaryl ether ketones can be synthesized with various molecular weights by electrophilic aromatic substitution (U.S. Pat. No. 3,065,205; U.S. Pat. No. 3,956,240) or nucleophilic aromatic substitution (J. Polymer Sci., 1967, A-1, 5, 2415–2427; U.S. Pat. No. 4,107,837; U.S. Pat. No. 4,175,175, DE-B-1545106, CA-A-847963, DE-A-2803873).

Both classes of polymer are processed thermoplastically. Exposure to high temperatures over long periods of time leads to decomposition and oxidation products in cycloolefin polymers. Shorter intervals of exposure to heat, i.e. higher outputs by improving the flow properties, during extrusion or injection molding would therefore be of advantage. For some uses of polyaryl ether ketones, for example as matrix materials for composites, their mechanical properties, for example the E modulus or the shear modulus, continue to be in need of improvement. In this connection, the high absorption of water by amorphous polyaryl ether ketones is troublesome. It limits long-term use at a high humidity, since the dimensional stability is not guaranteed. A lower absorption of water would therefore be of advantage. It is now known that important properties of polymers, such as those mentioned above, can be modified by alloying polymers with other polymers. However, predicting the properties of an alloy from the properties of the individual components with certainty is to date still a long way off.

The object of the present invention is therefore to provide alloys of cycloolefin polymers and polyaryl ether ketones having increased flow properties and a further improvement in the mechanical properties.

The invention relates to polymer alloys comprising at least two components (A) and (B), wherein (A) is at least one cycloolefin polymer and (B) is at least one polyaryl ether ketone, the alloys containing (A) in amounts of 1 to 99% by weight and (B) in amounts of 99 to 1% by weight and the amounts of (A) and (B) relatively making up 100% by weight with respect to the total alloy.

Cycloolefin polymers (A) which are suitable for the alloys according to the invention contain structural units which are derived from at least one monomer of the formulae I to VI or VII

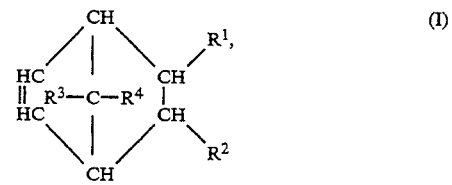

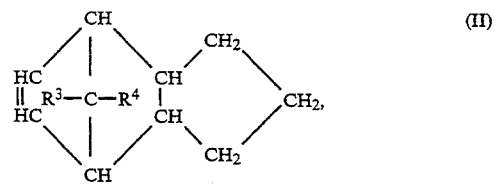

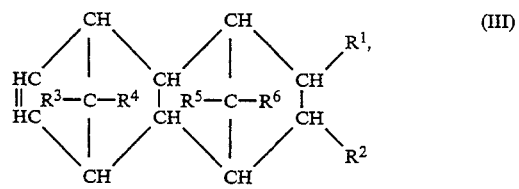

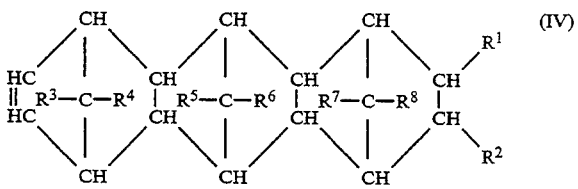

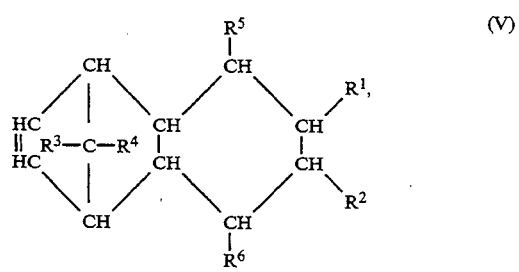

-continued

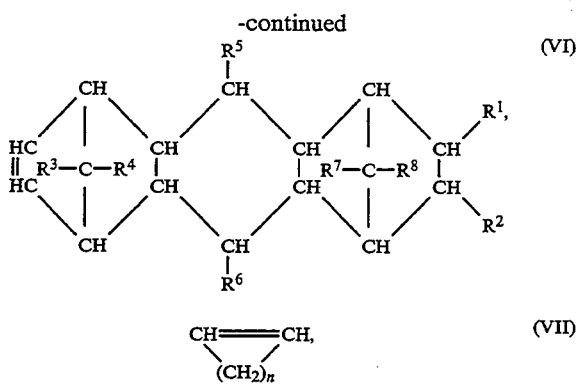

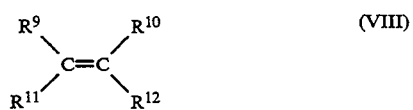

in which $R^1$, $R^2$, $R^3$, $R^4$, $R^5$, $R^6$, $R^7$ and $R^8$ are identical or different and are a hydrogen atom or a $C_1$-$C_8$-alkyl radical, and in which the same radicals in the various formulae can have a different meaning, and n is an integer from 2 to 10.

In addition to the structural units which are derived from at least one monomer of the formulae I to VII, the cycloolefin polymers (A) can contain other structural units which are derived from at least one acyclic 1-olefin of the formula VIII $$\underset{R^{11}}{\overset{R^9}{\diagdown}}C=C\underset{R^{12}}{\overset{R^{10}}{\diagup}} \quad \text{(VIII)}$$

in which $R^9$, $R^{10}$, $R^{11}$ and $R^{12}$ are identical or different and are a hydrogen atom or a $C_1$-$C_8$-alkyl radical. Preferred comonomers are ethylene or propylene. Copolymers of polycyclic olefins of the formulae I or III and the acyclic olefins of the formula VIII are employed in particular. Particularly preferred cycloolefins are norbornene and tetracyclododecene, which can be substituted by $C_1$-$C_6$-alkyl, ethylene/norbornene copolymers being of particular importance. Of the monocyclic olefins of the formula VII, cyclopentene, which can be substituted, is preferred. Polycyclic olefins, monocyclic olefins and open-chain olefins are also to be understood as meaning mixtures of two or more olefins of the particular type. I.e. cycloolefin homopolymers and copolymers, such as bi-, ter- and multipolymers, can be employed.

The cycloolefin polymerizations, which proceed via opening of the double bond, can be catalyzed either homogeneously, i.e. the catalyst system is soluble in the polymerization medium (DE-A-3 922 546, EP-A-0 203 799), or by a conventional Ziegler catalyst system (DD-A-222 317, DD-A-239 409).

The cycloolefin homo- and copolymers which contain structural units derived from monomers of the formulae I to VI or VII are preferably prepared with the aid of a homogeneous catalyst comprising a metallocene, the central atom of which is a metal from the group comprising titanium, zirconium, hafnium, vanadium, niobium and tantalum, which forms a sandwich structure with two monomer polynuclear ligands bridged to one another, and an aluminoxane. The preparation of the bridged metallocenes is carried out in accordance with a known reaction scheme (cf. J. Organomet. Chem. 288 (1985) 63–67 and EP-A-320 762). The aluminoxane, which functions as a co-catalyst, is obtainable by various methods (cf. S. Pasynkiewicz, Polyhedron 9 (1990) 429). The structure and also the synthesis of this catalyst and the conditions suitable for polymerization of these cycloolefins are described in detail in DE-A-3 922 546 and in a patent application of earlier priority which has not yet been prepublished (DE-A-4 036 264). Cycloolefin polymers having a viscosity number of greater than 20 $cm^3/g$ and a glass transition temperature of between 100° and 200° C. are preferably employed.

The alloys can also comprise cycloolefin polymers which have been polymerized by ring opening in the presence of, for example, catalysts containing tungsten, molybdenum, rhodium or rhenium. Cycloolefin polymers obtained by this process have double bonds, which can be removed by hydrogenation (U.S. Pat. No. 3,557,072 and U.S. Pat. No. 4,178,424).

The cycloolefin polymers employed for the alloys according to the invention can also be modified by grafting with at least one monomer chosen from the group comprising (a) α,β-unsaturated carboxylic acids and/or their derivatives, (b) styrenes, (c) organic silicone components which contain an olefinic unsaturated bond and a hydrolyzable group and (d) unsaturated epoxy components. The resulting modified cycloolefin polymers have similarly excellent properties to the non-modified cycloolefin polymers. They moreover specifically have a good adhesion to metals and synthetic polymers. The good compatibility with other polymers is to be singled out.

Polyaryl ether ketones (B) which are suitable according to the invention for the alloys are built up from at least one structural unit of the formula IX

in which
—X— is chosen from the bivalent radicals

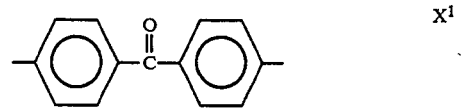

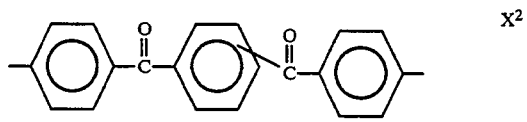

(meta-(m)- or para-(p)-linking for the central ring)

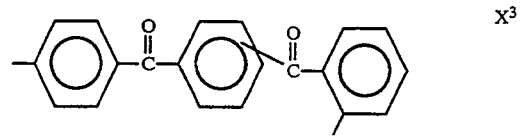

(m- or p-linking for the central ring)

and —Y— is chosen from the radicals

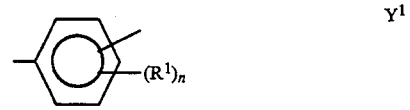

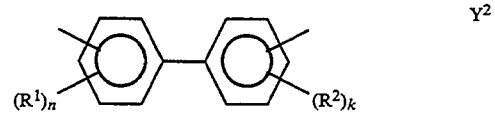

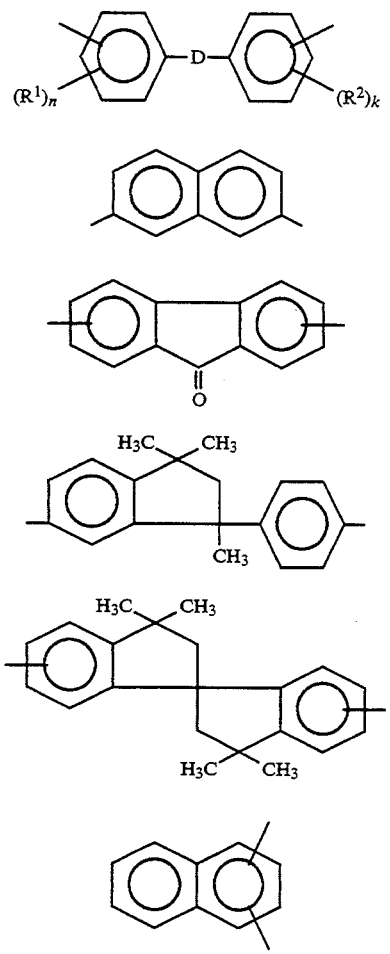

in which $R^1$ and $R^2$ are identical or different and are halogen, preferably bromine, $C_1$-$C_8$-alkyl or -alkoxy, preferably $C_1$-$C_4$-alkyl or -alkoxy, aryl groups, preferably phenyl, or aryloxy groups, k and n are identical or different and in general are the integers zero, 1, 2, 3 or 4, preferably zero, 1 or 2, in particular zero or 2, and D is a cycloalkylidene group or a group chosen from the following bivalent groups:

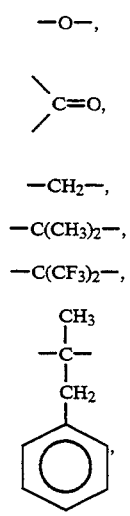

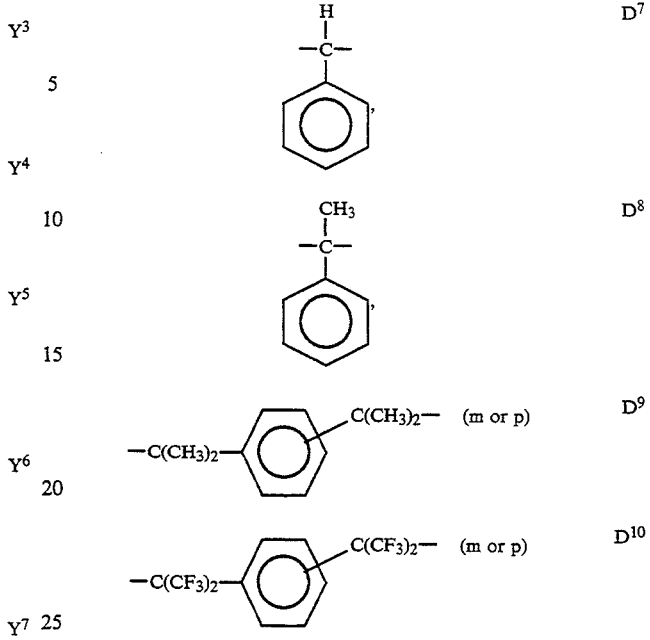

The molar ratio of the monomers containing —X— and —Y— is in general 0.95 to 1.05:1.00, preferably 1:1. In the case of polyaryl ether ketones which have been prepared using indane compounds with radicals $Y^6$ and $Y^7$, this molar ratio is in general 1.0001 to 1.0600:1, preferably 1.0020 to 1.0500:1, and in particular 1.0040 to 1.0500:1.

The polymers mentioned can be homopolycondensates, i.e. which contain in each case only one unit of the type —X— and one unit of the type —Y— per recurring unit, or copolycondensates which contain two or more different units of the type —X— and/or two or more different units of the type —Y—.

—X— is preferably chosen from $X^1$ and $X^2$, and particularly preferably is $X^2$. —Y— is preferably chosen from $Y^1$, $Y^2$ and $Y^3$, $Y^3$ being particularly preferred. —D— is preferably $D^2$, $D^3$, $D^4$, $D^5$, $D^6$, $D^7$, $D^8$, $D^9$, $D^{10}$ or a cycloalkylidene group $D^4$, $D^5$, $D^9$, $D^{10}$ or a cycloalkylidene group are particularly preferred.

If —X— has been chosen from $X^1$ and $X^2$, —Y— is not $Y^4$. If —Y— is $Y^3$ and n is zero, $D^1$ and $D^2$ are not chosen in this case.

If —X— is $X^3$ in the structural unit of the formula (IX), —Y— is preferably $Y^1$ or $Y^2$ and n is zero, 1 or 2, in particular zero.

If the polyaryl ether ketones are not homopolycondensates but copolycondensates, —X— is likewise preferably chosen from $X^1$ and $X^2$, and $X^2$ is particularly preferred. —Y— is preferably $Y^1$ and/or a radical chosen from $Y^2$ to $Y^8$. The combination $Y^1$ and $Y^3$ is particularly preferred. The sum of recurring structural units here in mol % defined as [a], i.e. —[—O—$Y^1$—O—$X^2$—]— and [b], i.e. —[—O —$Y^3$—O—$X^2$—]— is always 100 mol %. If [a] is 50 to 100 mol %, [b] is 0 to 50 mol % and partly crystalline polyaryl ether ketones thus result. If [a] is 0 to 49 mol % and [b] is 51 to 100 mol %, amorphous polyaryl ether ketones result.

Amorphous polyaryl ether ketones differ from the partly crystalline polyaryl ether ketones, both of which can be employed in the alloys according to the invention, in that they have no melting point but only a glass transition temperature of at least 140° C., preferably at least 155° C.

Homo- and copolycondensates which preferably contain $X^2$ and/or $X^3$ as —X— can likewise also be employed for the alloys of the invention. Preferred copolycondensates are a combination of $X^2$ and $X^3$, where —Y— is $Y^1$ and n is zero.

According to the invention, linear aromatic polyaryl ether ketones which are built up from at least one of the structural units (IX) and in which the radical —Y— is at least one radical $Y^6$ or $Y^7$, which can also contain additional units of the radical $Y^3$ in which —D— is the group $D^4$, can also be employed in the alloys. Such polyaryl ether ketones have a glass transition temperature of at least 170° C., preferably at least 185° C.

The indane-containing polyaryl ether ketones preferably have the structure

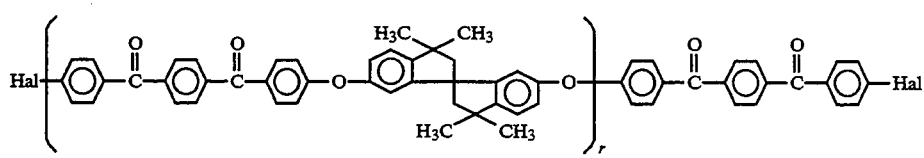

or

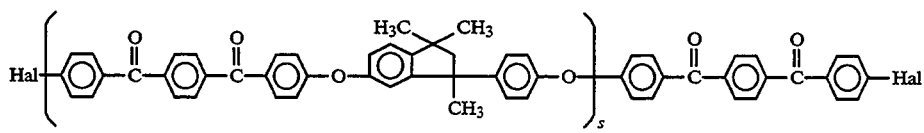

As mentioned, a bivalent radical of the formula

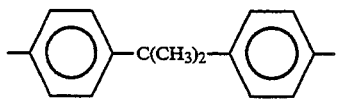

can also be present in addition to the indane grouping. The indices r and s in general have values of more than 10, the molecular weights resulting from the monomer ratios and manifesting themselves in the intrinsic viscosities of the polymers. Because of the slight excess of dihalogen compounds employed, the polyaryl ether ketones contain halogen atoms (Hal), in general chlorine and preferably fluorine, on the chain ends.

In addition to using a homo- or copolycondensate, it is also possible to employ polymer mixtures comprising two or more of the abovementioned homopolycondensates, one or more of the homopolycondensates mentioned and one or more of the copolycondensates mentioned, or two or more of the copolycondensates mentioned.

The preparation of the polyaryl ether ketones (B) is carried out under the customary conditions by the methods already mentioned, which are also described, for example, in High Performance Polymers, 1989, Vol. I(1), 41–59 and in Polymer, 29 (1988), 358–369.

The partly crystalline polyaryl ether ketones have intrinsic viscosities, determined in accordance with DIN 51562, as a measure of their molecular weight, measured in a solution of 0.1 g of the polymer in 100 ml of 96% strength sulfuric acid at 25° C., of in general 0.2 to 2.5 dl/g, preferably 0.4 to 2.5 dl/g, and in particular 0.4 to 2.0 dl/g.

The intrinsic viscosity of the amorphous polyaryl ether ketones, measured in a solution of 0.1 g of the polymer in 100 ml of chloroform at 25° C., is in general 0.2 to 2.5 dl/g, preferably 0.4 to 1.5 dl/g. The indane-containing polyaryl ether ketones have a viscosity of at least 0.3 dl/g.

The alloys according to the invention preferably comprise 3 to 97% by weight, and particularly preferably 5 to 95% by weight of the cycloolefin polymers (A) and preferably 97 to 3% by weight, and particularly preferably 95 to 5% by weight of the polyaryl ether ketones (B), the amounts of components A and B relatively making up 100% by weight with respect to the total alloy. The alloys according to the invention can comprise one or more cycloolefin polymers and one or more polyaryl ether ketones as well as modified cycloolefin polymers, modified polyaryl ether ketones and graft copolymers.

The alloys according to the invention are prepared and processed by the standard methods known for thermoplastics, such as, for example, by kneading, extrusion or injection molding.

The alloys according to the invention can comprise additives, for example heat stabilizers, UV stabilizers, antistatics, flameproofing agents, plasticizers, dyestuffs, pigments and inorganic and organic fillers, i.e. in particular also reinforcing additives, such as glass fibers, carbon fibers or high modulus fibers. The alloys can be employed particularly advantageously as a matrix material for composite materials. They are furthermore suitable for production of shaped articles by the injection molding or extrusion process, for example in the form of sheets, fibers, films and tubes.

The following polymers were prepared by standard methods:
Cycloolefin copolymer A1 [COC A1]
preparation of diphenylmethylene(9-fluorenyl)-cyclopentadienylzirconium dichloride-(metallocene L)

All the following working operations were carried out in an inert gas atmosphere using absolute solvents (Schlenk technique).

12.3 cm³ (30.7 mmol) of a 2.5 molar hexane solution of n-butyllithium were slowly added to a solution of 5.10 g (30.7 mmol) of fluorene in 60 cm³ of tetrahydrofuran at room temperature. After 40 minutes, 7.07 g (30.7 mmol) of diphenylfulvene were added to the orange solution and the mixture was stirred overnight. 60 cm³ of water were added to the dark-red solution, whereupon the solution became yellow in color, and the solution was extracted with ether. The ether phase was dried over MgSO₄ and concentrated and the residue was left to crystallize at −35° C. 5.1 g (42%) of 1,1-cyclopentadienyl(9-fluorenyl)diphenylmethane were obtained as a beige powder.

2.0 g (5.0 mmol) of the compound were dissolved in 20 cm³ of tetrahydrofuran, and 6.4 cm³ (10 mmol) of a 1.6 molar solution of butyllithium in hexane were added at 0° C. After the mixture had been stirred at room temperature for 15 minutes, the solvent was stripped off and the red residue was dried under an oil pump vacuum and washed several times with hexane. After drying under an oil pump vacuum, the red powder was added to a suspension of 1.16 g (5.00 mmol) of $ZrCl_4$ at −78° C. After warming up slowly, the mixture was stirred at room temperature for a further 2 hours. The pink-colored suspension was filtered over a G3 frit. The pink-red residue was washed with 20 cm³ of $CH_2Cl_2$, dried under an oil pump vacuum and extracted with 120 cm³ of toluene. After the solvent had been stripped off and the product had been dried under an oil pump vacuum, 0.55 g of the zirconium complex was obtained in the form of a pink-red crystalline powder.

The orange-red filtrate of the reaction mixture was concentrated and the residue was left to crystallize at −35° C. A further 0.45 g of the complex crystallizes from $CH_2Cl_2$.

Overall yield 1.0 g (36%). Correct elemental analyses. The mass spectrum showed $M^+ = 556$. $^1$H-NMR spectrum (100 MHz, $CDCl_3$): 6.90–8.25 (m, 16, Flu-H, Ph-H), 6.40 (m, 2, Ph-H), 6.37 (t, 2, Cp-H), 5.80 (t, 2, Cp-H).

B) Preparation of COC A1

A clean, dry 75 dm³ polymerization reactor with a stirrer was flushed with nitrogen and then with ethylene and filled with 22 000 g of a norbornene melt (Nb). The reactor was then brought to a temperature of 70° C., while stirring, and 6 bar of ethylene were forced in.

Thereafter, 580 cm³ of a toluene solution of methylaluminoxane (10.1% by weight of methylaluminoxane of molar mass 1 300 g/mol according to cryoscopic determination) were metered into the reactor and the mixture was stirred at 70° C. for 15 minutes, the ethylene pressure being kept at 6 bar by subsequent metering-in. In parallel, 500 mg of metallocene were dissolved in 500 cm³ of a toluene solution of methylaluminoxane (for the concentration and quality see above) and were preactivated by being left to stand for 15 minutes. The solution of the complex (catalyst solution) was then metered into the reactor (to reduce the molecular weight, hydrogen can be fed into the reaction vessel via a sluice immediately after metering the catalyst). Polymerization was then carried out at 70° C. for 140 minutes, while stirring (750 revolutions/ minute), the ethylene pressure being kept at 6 bar by subsequent metering-in. The contents of the reactor were then drained rapidly into a stirred vessel into which 200 cm³ of isopropanol (as a stopper) had first been introduced. The mixture was precipitated in acetone and stirred for 10 minutes and the suspended polymeric solid was then filtered off.

A mixture of two parts of 3-normal hydrochloric acid and one part of ethanol was then added to the polymer which had been filtered off and the mixture was stirred for 2 hours. The polymer was then filtered off again, washed neutral with water and dried at 80° C. and 0.2 bar for 15 hours. An amount of product of 4400 g was obtained.

Cycloolefin copolymer A2 [COC A2]

A) Preparation of rac-dimethylsilylbis(1-indenyl)-zirconium dichloride (metallocene A)

All the following working operations were carried out under an inert gas atmosphere using absolute solvents (Schlenk technique).

80 cm³ (0.20 mol) of a 2.5 molar solution of n-butyllithium in hexane were added to a solution of 30 g (0.23 mol) of indene (technical grade 91%), filtered over aluminum oxide, in 200 cm³ of diethyl ether while cooling with ice. The mixture was stirred at room temperature for a further 15 minutes and the orange-colored solution was introduced via a cannula into a solution of 13.0 g (0.10 mol) of dimethyldichlorosilane (99%) in 30 cm³ of diethyl ether in the course of 2 hours. The orange-colored suspension was stirred overnight and extracted by shaking three times with 100–150 cm³ of water. The yellow organic phase was dried twice over sodium sulfate and evaporated in a rotary evaporator. The orange oil which remained was kept at 40° C. under an oil pump vacuum for 4 to 5 hours and freed from excess indene, a white precipitate separating out. By addition of 40 cm³ of methanol and crystallization at −35° C., a total of 20.4 g (71%) of the compound $(CH_3)_2Si(Ind)_2$ were isolated as a white to beige powder. Melting point 79°–81° C. (2 diastereomers).

15.5 cm³ (38.7 mmol) of a 2.5 molar hexane solution of butyllithium were slowly added to a solution of 5.6 g (19.4 mmol) of $(CH_3)_2Si(Ind)_2$ in 40 cm³ of tetrahydrofuran at room temperature. 1 hour after the addition had ended, the deep-red solution was added dropwise to a suspension of 7.3 g (19.4 mmol) of $ZrCl_4 \cdot 2THF$ in 60 cm³ of tetrahydrofuran in the course of 4–6 hours. After the mixture had been stirred for 2 hours, the orange precipitate was filtered off with suction over a glass frit and recrystallized from $CH_2Cl_2$. 1.0 g (11%) of rac-$(CH_3)_2Si(Ind)_2$—$ZrCl_2$ was obtained in the form of orange crystals which gradually decompose above 200° C. Correct elemental analyses. The E1 mass spectrum showed $M^+ = 448$. $^1$H-NMR spectrum ($CDCl_3$): 7.04–7.60 (m, 8, arom. H), 6.90 (dd, 2, β-Ind H), 6.08 (d, 2, α-Ind H), 1.12 (s, 6, $SiCH_3$).

B) Preparation of COC A2

The preparation of COC A2 was carried out analogously to that of COC A1, some conditions summarized in Table 1 being changed.

TABLE 1

| Cycloolefin copolymer | Amount of norbornene [g] | Temp. [°C.] | Pressure [bar] | Metallocene Nature | Metallocene Amount [mg] | Catalyst solution [ml] | Time [min] | Amount of product [g] |
|---|---|---|---|---|---|---|---|---|
| A2 | 25000 | 70 | 10 | A | 3000 | 1000 | 220 | 5100 |

*Metallocene A: rac-dimethylsilylbis(1-indenyl)-zirconium dichloride

The physical parameters of the two cycloolefin copolymers can be seen from Table 2.

TABLE 2

| Cyclo-olefin copolymer | Incorporation of* | | VN [cm³/g] | $M_w \times 10^{-5}$ [g/mol] | $M_n \times 10^{-4}$ [g/mol] | $M_w/M_n$ |
|---|---|---|---|---|---|---|
| | Ethylene [mol %] | Norbornene [mol %] | | | | |
| A1 | 48 | 52 | 106 | 1.48 | 4.30 | 3.4 |
| A2 | 50 | 50 | 90 | 0.94 | 4.81 | 2.0 |

*determined by $^{13}C$ nuclear magnetic resonance spectroscopy

VN: Viscosity numbers determined in accordance with DIN 53728

$M_w, M_n$: GPC 150-C ALC Millipore Waters Chromatograph Column set: 4 Shodex columns AT-80 M/S Solvent: o-dichlorobenzene at 135° C. Flow rate: 0.5 ml/minute, concentration 0.1 g/dl RI detector, calibration: polyethylene (901 PP)

Further characteristics of the cycloolefin copolymers can be seen from the Examples.

Partly crystalline polyaryl ether ketone B1 and amorphous polyaryl ether ketone B3 having structural units a and b of the formulae

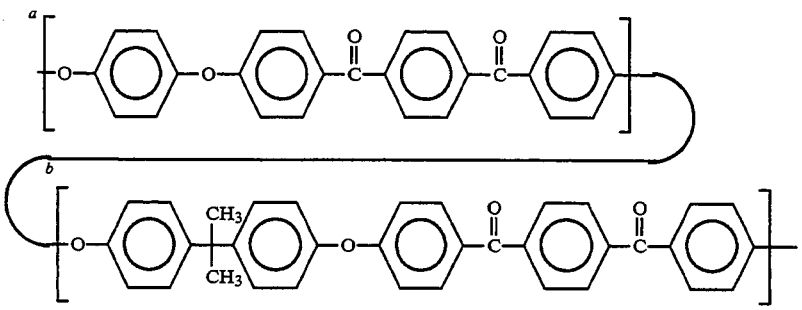

B1 containing 70 mol % of structural units a and 30 mol % of structural units b and B3 containing 40 mol % of structural units a and 60 mol % of structural units b. The intrinsic viscosity of B1, measured in 96% strength sulfuric acid at 25° C., is 0.45 dl/g. The intrinsic viscosity of B3, measured in chloroform at 25° C., is 0.50 dl/g.

Amorphous polyaryl ether ketones B2 and B4 having structural units of the formula

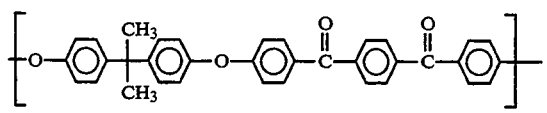

the intrinsic viscosity of which, measured in chloroform at 25° C., is 0.65 dl/g (B2) and 0.50 dl/g (B4).

The polymers described above were first dried (130° C., 24 hours, vacuum) and then kneaded or extruded in various weight ratios in a measuring kneader (HAAKE (Karlsruhe), Rheocord System 40 / Rheomix 600) or measuring extruder (HAAKE (Karlsruhe), Rheocord System 90 / Rheomex TW 100) under an inert gas (Ar). The resulting ground or granulated alloys were dried (130° C., 24 hours, vacuum) and then pressed (vacuum press: Polystat 200 S, Schwabenthan (Berlin)) to form sheets (120×1 mm). The ground or granulated alloys were introduced into an appropriate mold in the press, which had been preheated to 335° C., a vacuum was applied and the alloys were melted for 10 minutes. The press was brought together under a pressing pressure of 100 bar at the above temperature, left for 5 minutes and cooled to room temperature in the course of 10 minutes.

The resulting melt pressed sheets were investigated for their physical properties.

The following apparatus was used for this purpose:

A differential scanning calorimeter (DSC-7) from Perkin-Elmer (Überlingen) for measurement of, for example, glass stages, melting points and heats of fusion.

A torsional pendulum machine from Brabender (Duisburg) for measurement of shear modulus, damping and linear extension.

A tensile stress-elongation tester (type: Instron 4302) from Instron (Offenbach).

A melt flow index tester MPS-D from Goettfert (Buchen) for measurement of flow properties, melt flow index in accordance with DIN 53735-MFI-B, plunger load/temperature variable; cylinder: internal dimension 9.55 (±0.01) mm, length at least 115 mm, exit die 2. 095 (±0. 005) mm. 5 minutes was selected as the melting time.

The water content was determined in accordance with ASTM D 4019-81.

EXAMPLE 1:

The cycloolefin copolymer (A1) and the partly crystalline polyaryl ether ketone (B1) were kneaded together in various weight ratios by means of the measuring kneader under an argon atmosphere, after intensive drying. The following table shows the thermal properties determined on the alloys.

| Cyclo-olefin copolymer (A1) [% by wt.] | Partly crystalline polyaryl ether ketone (B1) [% by wt.] | 2nd Heating | | | Tg (cycloolefin copolymer) [°C.] |
|---|---|---|---|---|---|
| | | Tg [°C.] | Tm (partly crystalline polyether ketone) [°C.] | dHm [J/g] | |
| 100 | 0 | — | — | — | 183.0 |
| 70 | 30 | 162.2 | 322.1 | 11.0 | 182.7 |
| 30 | 70 | 162.4 | 323.0 | 19.0 | 182.8 |
| 0 | 100 | 162.5 | 320.7 | 26.0 | — |

Heating-up rate: 20 K/minute

EXAMPLE 2:

The cycloolefin copolymer (A1) and the partly crystalline polyaryl ether ketone (B1) were kneaded together in various weight ratios by means of the measuring kneader under an argon atmosphere, after intensive drying, and the mixture was then ground. The ground products were used, after intensive drying, for measurement of the flow properties.

| Cycloolefin copolymer (A1) [% by wt.] | Partyl crystalline polyaryl ether ketone (B1) [% by wt.] | MFI (MVI) 3.8 kp 300° C. [cm³/10 minutes.] |
|---|---|---|
| 100 | 0 | 60.5 |
| 70 | 30 | 130.0 |
| 30 | 70 | >200* |
| 0 | 100 | 33.6 |

*only measurable up to 200 cm³/10 mintues, specific to the apparatus.

EXAMPLE 3:

The cycloolefin copolymer (A1) and the amorphous polyaryl ether ketone (B2) were kneaded together in various weight ratios by means of the measuring kneader under an argon atmosphere, after intensive drying. The following table shows the thermal properties determined on the alloys.

| Cycloolefin copolymer (A1) [% by wt.] | Amorphous polyaryl ether ketone (B2) [% by wt.] | 2nd heating | |
|---|---|---|---|
| | | Tg (amorphous polyaryl ether ketone) [°C.] | Tg (cycloolefin copolymer) [°C.] |
| 100 | 0 | — | 183.0 |
| 70 | 30 | 158.7 | 182.7 |
| 50 | 50 | 158.9 | 183.1 |
| 30 | 70 | 160.4 | 182.8 |
| 0 | 100 | 158.8 | — |

Heating-up rate: 20 K/minute

EXAMPLE 4

The cycloolefin copolymer (A1) and the amorphous polyaryl ether ketone (B2) were kneaded together in various weight ratios by means of the measuring kneader under an argon atmosphere, after intensive drying, and the mixture was then ground. The ground products were dried intensively and the absorption of water was determined after storage for 564 hours at 23° C. and 85% relative humidity.

| Cycloolefin copolymer (A1) [% by wt.] | Amorphous polyaryl ether ketone (B2) [% by wt.] | Water content [% by wt.] |
|---|---|---|
| 100 | 0 | 0.01 |
| 70 | 30 | 0.12 |
| 50 | 50 | 0.18 |
| 30 | 70 | 0.22 |
| 0 | 100 | 0.39 |

EXAMPLE 5:

The cycloolefin copolymer (A1) and the amorphous polyaryl ether ketone (B2) were kneaded together in various weight ratios by means of the measuring kneader under an argon atmosphere, after intensive drying, and the mixture was then ground. The ground products were used, after intensive drying, for measurement of the flow properties.

| Cycloolefin copolymer (A1) [% by wt.] | Amorphous polyaryl ether ketone (B2) [% by wt.] | MFI (MVI) 3.8 kp, 300° C. [cm³/10 minute] |
|---|---|---|
| 100 | 0 | 14.5 |
| 70 | 30 | 62.3 |
| 50 | 50 | 61.0 |
| 30 | 70 | 23.7 |
| 0 | 100 | 7.1 |

Example 6:

The cycloolefin copolymer (A1) and the amorphous polyaryl ether ketone (B3) were kneaded together in various weight ratios by means of the measuring kneader under an argon atmosphere, after intensive drying. The following table shows the thermal properties determined on the alloys.

| Cycloolefin copolymer (A1) [% by wt.] | Amorphous polyaryl ether ketone (B2) [% by wt.] | 2nd heating | |
|---|---|---|---|
| | | Tg (amorphous polyaryl ether ketone) [°C.] | Tg (cycloolefin copolymer) [°C.] |
| 100 | 0 | — | 183.0 |
| 70 | 30 | 158.0 | 182.8 |
| 50 | 50 | 159.0 | 182.9 |
| 30 | 70 | 159.5 | 182.3 |
| 0 | 100 | 159.5 | — |

Heating-up rate: 20 K/minute

EXAMPLE 7:

The cycloolefin copolymer (A1) and the amorphous polyaryl ether ketone (B3) were kneaded together in various weight ratios by means of the measuring kneader under an argon atmosphere, after intensive drying, and the mixture was then ground. The ground products were pressed to form pressed sheets, after intensive drying. The following table shows the mechanical data determined on the alloys.

| Cycloolefin copolymer (A1) [% by wt.] | Amorphous polyaryl ether ketone (B3) [% by wt.] | Shear modulus G' (Torsional pendulum) [N/mm × mm] Temperature [°C.] | | | | | | |
|---|---|---|---|---|---|---|---|---|
| | | −160.5 | −120.7 | −40.5 | 0.5 | 40.5 | 100.5 | 150.2 |
| 100 | 0 | 1684 | 1466 | 1236 | 1187 | 1137 | 1043 | 962 |
| 70 | 30 | 1465 | 1289 | 1076 | 1026 | 980 | 911 | 821 |
| 50 | 50 | 1423 | 1274 | 1057 | 1001 | 952 | 877 | 770 |
| 30 | 70 | 1329 | 1205 | 975 | 912 | 863 | 793 | 665 |
| 0 | 100 | 1349 | 1241 | 970 | 898 | 855 | 794 | 658 |

EXAMPLE 8:

The cycloolefin copolymer (A1) and the amorphous polyaryl ether ketone (B3) were kneaded together in various weight ratios by means of the measuring kneader under an argon atmosphere, after intensive drying, and the mixture was then ground. The ground products were used, after intensive drying, for measurement of the flow properties.

| Cycloolefin copolymer (A1) [% by wt.] | Amorphous polyaryl ether ketone (B3) [% by wt.] | MFI (MVI) 5 kp, 300° C. [cm³/10 minute] |
|---|---|---|
| 100 | 0 | 37.9 |
| 70 | 30 | 108.3 |
| 50 | 50 | 131.7 |
| 30 | 70 | 149.0 |
| 0 | 100 | 3.2 |

EXAMPLE 9:

The cycloolefin copolymer (A2) and the amorphous polyaryl ether ketone (B4) were extruded together in various weight ratios by means of the twin-screw extruder under an argon atmosphere, after intensive drying, and the extruded material was granulated. The following table shows the thermal properties determined on the alloys.

| Cycloolefin copolymer (A2) [% by wt.] | Amorphous polyaryl ether ketone (B4) [% by wt.] | 2nd heating | |
|---|---|---|---|
| | | Tg (amorphous polyether ketone) [°C.] | Tg (cycloolefin copolymer) [°C.] |
| 100 | 0 | — | 173.7 |
| 70 | 30 | 159.1 | 173.1 |
| 50 | 50 | 158.3 | 173.9 |
| 30 | 70 | 158.3 | 171.8 |
| 0 | 100 | 159.0 | — |

Heating-up rate: 20 K/minute

EXAMPLE 10:

The cycloolefin copolymer (A2) and the amorphous polyaryl ether ketone (B4) were extruded together in various weight ratios by means of the twin-screw extruder under an argon atmosphere, after intensive drying, and the extruded material was granulated. The granules were then pressed to form pressed sheets, after intensive drying. The following table shows the mechanical data determined on the alloys.

| Cycloolefin copolymer (A2) [% by wt.] | Amorphous polyaryl ether ketone (B4) [% by wt.] | Elasticity modulus [GPa] |
|---|---|---|
| 100 | 0 | 3.2 |
| 70 | 30 | 3.0 |
| 30 | 70 | 2.9 |
| 0 | 100 | 2.8 |

We claim:

1. A polymer alloy comprising at least two components (A) and (B), wherein (A) is at least one cycloolefin polymer and (B) is at least one polyaryl ether ketone, the alloys containing (A) in amounts of 1 to 99% by weight and (B) in amounts of 99 to 1% by weight, based on the sum of (A) and (B).

2. A polymer alloy as claimed in claim 1, wherein the cycloolefin polymers (A) contain structural units which are derived from at least one monomer of the formulae I to VII

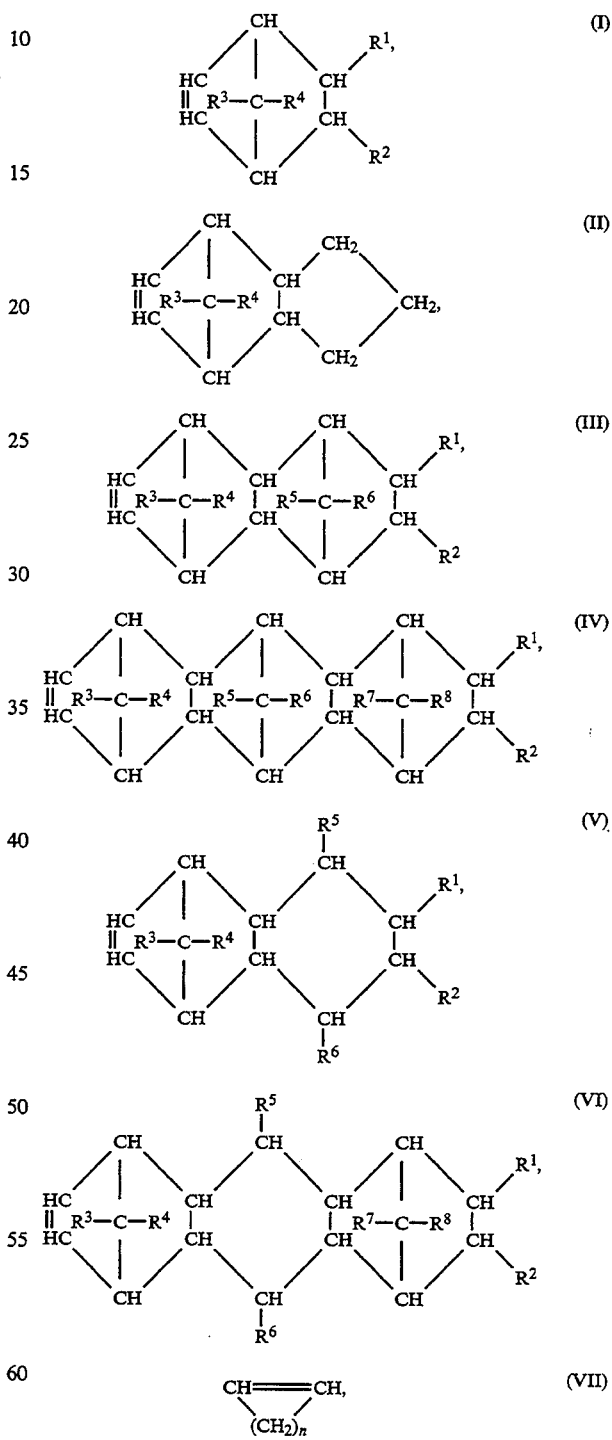

in which $R^1$, $R^2$, $R^3$, $R^4$, $R^5$, $R^6$, $R^7$ and $R^8$ are identical or different and are a hydrogen atom or a $C_1$–$C_8$-alkyl radical, and in which the same radicals in the various formulae can have a different meaning, and n is an integer from 2 to 10.

3. An alloy as claimed in claim 2, wherein the cyclo-olefin polymer (A) contains, in addition to the structural units which are derived from at least one monomer of the formulae I to VII, other structural units which are derived from at least one acyclic 1-olefin of the formula VIII

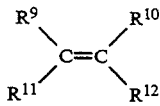 (VIII)

in which $R^9$, $R^{10}$, $R^{11}$ and $R^{12}$ are identical or different and are a hydrogen atom or a $C_1$-$C_8$-alkyl radical.

4. An alloy as claimed in claim 3, wherein the cyclo-olefin polymer (A) is a copolymer of a polycyclic olefin of the formula I or III and an ayclic olefin of the formula VIII.

5. An alloy as claimed in claim 4, wherein the cyclo-olefin polymer (A) is a copolymer of norbornene and ethylene.

6. An alloy as claimed in claim 1, wherein the poly-aryl ether ketone (B) is built up from at least one structural unit of the formula (IX)

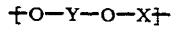 (IX)

in which

—X— is selected from the group consisting of bivalent radicals of the formula:

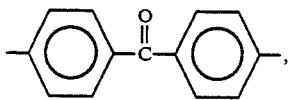 ($X^1$)

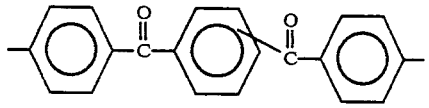 ($X^2$)

(meta- or para- substitution) and

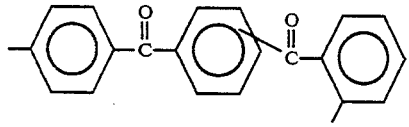 ($X^3$)

and

—Y— is selected from the group consisting of radicals of the formula:

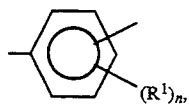 ($Y^1$)

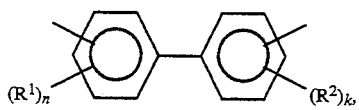 ($Y^2$)

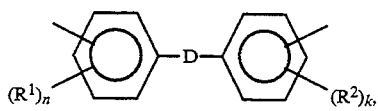 ($Y^3$)

-continued

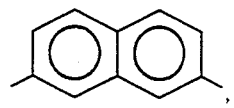 ($Y^4$)

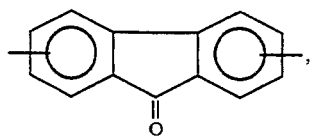 ($Y^5$)

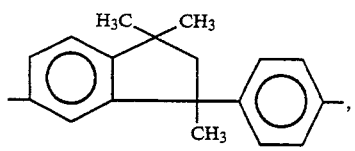 ($Y^6$)

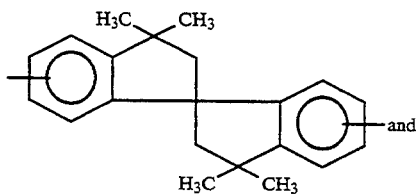 ($Y^7$) and

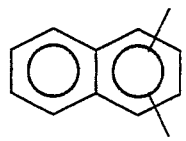 ($Y^8$)

in which $R^1$ and $R^2$ are identical or different and are halogen, $C_1$-$C_8$-alkyl or -alkoxy, or aryl or aryloxy groups, k and n are identical or different and are the integers zero, 1, 2, 3 or 4 and D is a cyclo-alkylidene group or a group selected from the group consisting of bivalent groups of the formula:

—O—, ($D^1$)

 ($D^2$)

—$CH_2$—, ($D^3$)

—$C(CH_3)_2$—, ($D^4$)

—$C(CF_3)_2$—, ($D^5$)

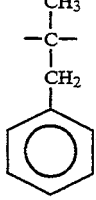 ($D^6$)

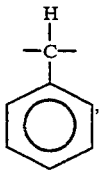 ($D^7$)

-continued

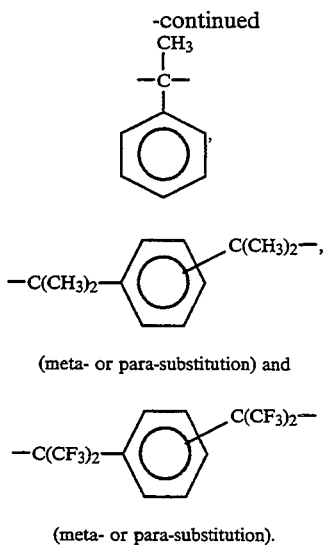

(D⁸)

(D⁹) (meta- or para-substitution) and (D¹⁰) (meta- or para-substitution).

7. An alloy as claimed in claim 6, in which —X— is chosen from X¹ and X², —Y— is at least one bivalent radical chosen from Y¹ to Y⁸ and —D— is D⁴, D⁵, D⁹, D¹⁰ or a cycloalkylidene group.

8. An alloy as claimed in claim 7, wherein the polyaryl ether ketone (B) has structural units of the following formulae:

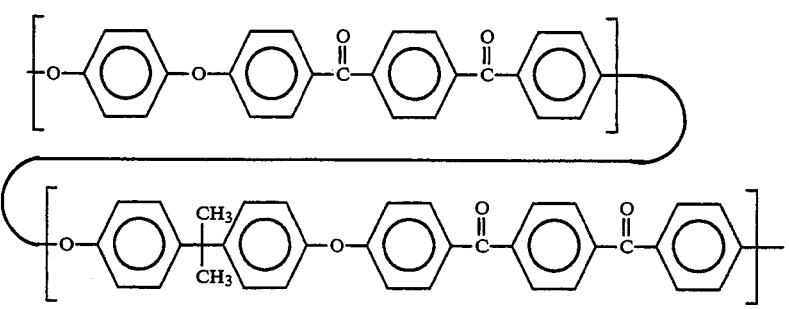

or

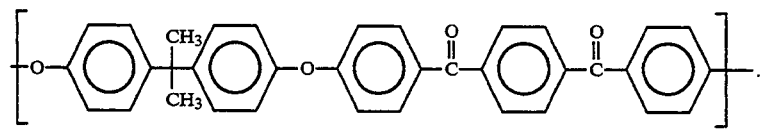

| | |
|---|---|
| —O—, | (D¹) |
| \>C=O, | (D²) |
| —CH₂—, | (D³) |
| —C(CH₃)₂—, | (D⁴) |
| —C(CF₃)₂—, | (D⁵) |

-continued

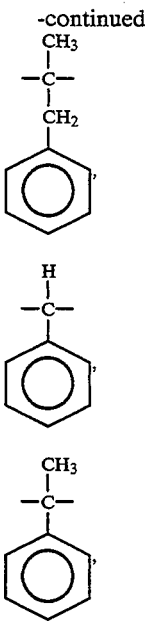

(D⁶)

(D⁷)

(D⁸)

(D⁹)

(meta- or para-substitution) and

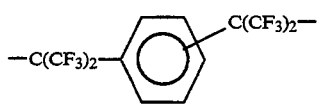

(D¹⁰)

(meta- or para-substitution).

9. An alloy as claimed in claim 1, in which the cycloolefin polymer (A) comprises a copolymer of norbornene and ethylene and the polyaryl ether ketone (B) contains structural units of the formula

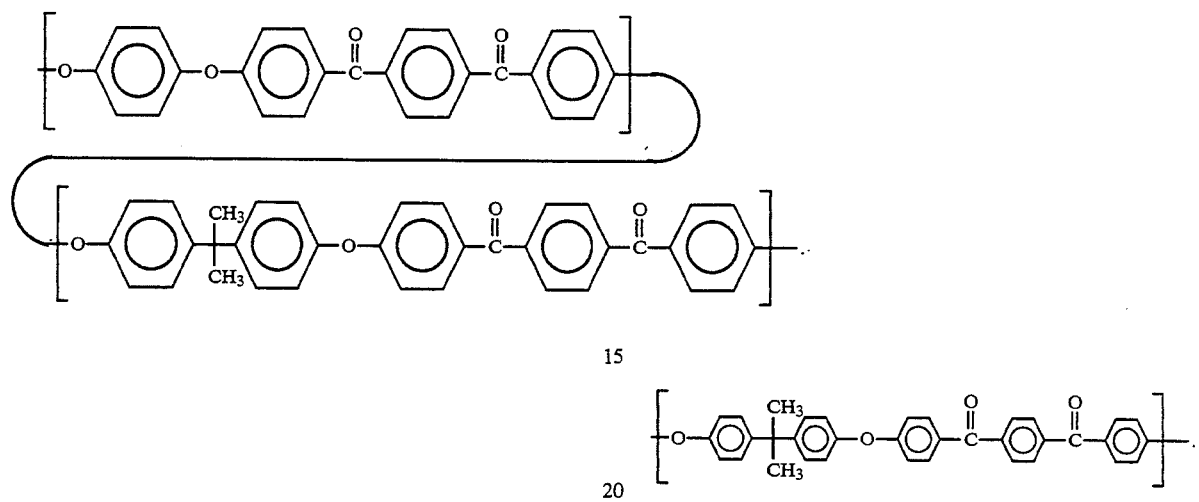
10. An alloy as claimed in claim 1, wherein the cycloolefin polymer (A) comprises a copolymer of norbornene and ethylene and the polyaryl ether ketone (B) contains structural units of the formula
11. The use of an alloy as claimed in claim 1 as a matrix material for composite materials or for the production of shaped articles.
* * * * *